US008243714B1

(12) United States Patent
Hilton et al.

(10) Patent No.: US 8,243,714 B1
(45) Date of Patent: Aug. 14, 2012

(54) METHOD AND APPARATUS FOR HIERARCHIAL SYSTEM SYNCHRONIZATION

(75) Inventors: Howard Hilton, Snohomish, WA (US); Darrin Dennis Rath, Santa Rosa, CA (US); Gerald J. Ringel, Marysville, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1100 days.

(21) Appl. No.: 12/115,100

(22) Filed: May 5, 2008

(51) Int. Cl.
*H04J 3/06* (2006.01)

(52) U.S. Cl. .................................. 370/350; 370/509

(58) Field of Classification Search .................. 370/345, 370/350, 498, 503–504, 506–507, 509, 510–514
See application file for complete search history.

(56) References Cited

U.S. PATENT DOCUMENTS

| | | | | |
|---|---|---|---|---|
| 6,263,452 B1* | 7/2001 | Jewett et al. | | 714/5.11 |
| 6,542,754 B1* | 4/2003 | Sayers et al. | | 455/502 |
| 6,622,208 B2* | 9/2003 | North | | 711/118 |
| 6,895,189 B1* | 5/2005 | Bedrosian | | 398/155 |
| 7,430,261 B2* | 9/2008 | Forest et al. | | 375/364 |
| 2003/0177154 A1* | 9/2003 | Vrancic | | 708/160 |
| 2003/0235216 A1* | 12/2003 | Gustin | | 370/509 |
| 2005/0141565 A1* | 6/2005 | Forest et al. | | 370/503 |
| 2006/0280182 A1* | 12/2006 | Williams et al. | | 370/394 |
| 2008/0025344 A1* | 1/2008 | Biederman et al. | | 370/498 |
| 2010/0054282 A1* | 3/2010 | Schirmer et al. | | 370/503 |
| 2010/0061404 A1* | 3/2010 | Newald | | 370/503 |

OTHER PUBLICATIONS

HP E1430A Operator's Guide—Hardware Reference (Control Registers)—2 Pages, Jun. 1994.

* cited by examiner

*Primary Examiner* — Chi H. Pham
*Assistant Examiner* — Kevin Mew

(57) ABSTRACT

An apparatus includes a global synchronization interface and multiple modules. The global synchronization interface includes a global synchronization driver for driving a global synchronization signal. The modules include corresponding local synchronization interfaces, each local synchronization interface having a local synchronization driver for driving a local synchronization signal. In a local mode, the modules ignore the global synchronization signal and synchronize corresponding operations according to the local synchronization signal and a global reference signal. In a global mode, the modules ignore the local synchronization signal and synchronize the corresponding operations according to the global synchronization signal and the global reference signal.

20 Claims, 4 Drawing Sheets

METHOD AND APPARATUS FOR HIERARCHIAL SYSTEM SYNCHRONIZATION

BACKGROUND

Multiple-input multiple-output (MIMO) solutions typically require synchronization of multiple devices or instruments. Often, MIMO solutions involve complex stimulus response measurements, which require source and receiver synchronization that will not tolerate clock period ambiguity, regardless of the clock frequency. Accordingly, the multiple devices may be synchronized using a reference clock and an open collector signal, which may be referred to as a synchronization signal or "sync."

For example, devices may use a 10 MHz reference signal to establish a common frequency reference within a measurement system. However, event timing synchronization has typically been achieved through trigger input/output signals, which are treated by each device as asynchronous to the reference signal. Each device generates or interprets the trigger signals based on unique clocks contained within the device. Therefore, timing synchronization has ambiguity based on the independent quantization of time by each device. Additional ambiguity may be incurred at multiple clock boundaries within a single device, further worsening overall trigger jitter.

FIG. 1 is a simplified block diagram showing a conventional MIMO system 100 in which multiple devices 105(1), 105(2), ... 105(N) in a daisy chain are synchronized based on sync signal 101 and reference signal 102. Each of the devices 105(1) through 105(N) in the chain may be a separate instrument or a separate subsystem, such as a separate plug-in board, within one instrument.

FIG. 1 shows the daisy chain connection using external T's with each device 105(1) through 105(N), where each device 105(1) through 105(N) has a high impedance, low capacitance input. The reference line may be terminated with an external load (e.g., 50 ohms) attached to the final T. Conventional devices typically use 50 ohm terminated reference inputs, so another reference signal 102 distribution uses a matched power splitter driving a star configuration with matched cable lengths. The star connection eliminates the inherent timing skew of the daisy chain. However, it requires a larger drive level of the reference signal 102 at the input of the splitter.

In order to enable synchronization among the devices 105 (1) through 105(N), each device may include a sync buffer, which receives the reference signal 102 and the sync signal 101. An example of a sync buffer 200 is shown in FIG. 2. Referring to FIG. 2, the sync buffer 200 receives the reference signal 102 through reference line 112, and the sync signal 101 through sync line 111.

The reference line 112 provides the reference signal 102, which is used as RefIn for synchronizing operations. The reference line 112 may be an unterminated backplane trace (not shown), for example, connected to a single pin on plug-in boards corresponding to one or more devices 105(1) through 105(N). One of the devices 105(1) through 105(N) plugged into the backplane must drive the reference line 102, for example, with transistor-transistor logic (TTL) compatible square wave having a frequency of the reference signal 102. This reference device or reference board, as the case may be, assures that the reference signal 102 on the backplane has a fixed timing relationship to the reference signal 102 on an instrument rear panel. Specifically, if two instruments are locked via the reference signal 102, then the rising edges of their reference signals 102 must be within 10 ns of each other, assuming the reference signal 102 is a 10 MHz signal. It is assumed that the rear panel reference signal 102 input and output are directly cabled to the reference board, not via the backplane. Thus, the 10 ns skew requirement is actually enforced by the reference board design.

The sync line 111 is connected to node 121, which is connected to buffer 122 through resistance 125. The buffer 122 provides a SyncIn signal for marking edges the reference signal 102, as discussed above. More particularly, the device 105(1) will sample a state of the sync line 111 at each rising edge of the reference signal 102. The sync line 111 may also be a backplane trace (not shown), for example, connected to a single pin on plug-in boards corresponding to one or more devices 105(1) through 105(N). A coaxial cable (not shown) is connected from the sync line 111 to an externally accessible rear panel connector.

The sync buffer 200 also includes output buffer 124, which receives SyncOut signal generated by the device 105(1). The output buffer 124 is connected to ground and node 121, which is also connected in series with voltage source V+ through pull-up resistance 135. The value of the pull-up resistance 135 may be chosen to achieve an RC time constant of approximately 25 ns, where C is the total capacitance of the Sync node inside the device 105(1), plus 50 pf for external cable capacitance. This allows 0.5 m of 50 ohm cable per device for sync interconnect. When the device 105(1) has with long internal sync routing, for example, an optional bead (not shown) should be added near the connector of the sync line 111 to provide damping of stub resonance. In the conventional system, the parallel combination of pull-up resistors in the system must be greater than 50 ohms due to the sink current limit of the drivers. This limits the number of instruments which can be connected to the sync line 111.

Also, in this example, the total capacitance of the sync line 111 to ground, with no plug-in boards and no external sync connection, must be less than 67 pf, including the coax to the rear panel connector. The total capacitance of the sync line 111 on the device 105(1), for example, must be less than 11 pf. The dedicated SyncOut and SyncIn signals are connected to the timing control circuit of each participating device, e.g., device 105(1). To minimize capacitance of the sync line 111, the dedicated lines may be routed to a location near the sync connector where all input/output buffering is performed.

The use of sync signal 101 and reference signal 102 in the MIMO system 100, including instruments such as a spectrum analyzer, presents certain problems. A device typically contains multiple sub-systems or boards, each of which is a separate module with regard to the sync signal 101 and the reference signal 102. For example, a swept spectrum analyzer contains a sweeper, which generates a local oscillator (LO) frequency for a first mixer, and a receiver, which captures a final intermediate frequency (IF) signal. During normal operation, these modules of the spectrum analyzer must be synchronized to each other, even if the spectrum analyzer is not synchronized with other instruments. Therefore, a hierarchy of modules arises: A "local" or "instrument" level of the hierarchy includes participating modules within a single instrument and a "global" or "system" level of the hierarchy includes synchronization between instruments.

However, conventional implementations using the sync signal 101 and the reference signal 102 is non-hierarchical, meaning that it does not distinguish between the local and global levels of operation. For example, with respect to automated test equipment (ATE), some measurements require multiple instruments to be synchronized with one another, while other measurements require each instrument to act independently. To accommodate independent operation, the sync line 111 must be physically disconnected to disable the sync connection between the instruments. However, the wired-OR nature of the sync line 111 complicates attempts to automate this disconnection using software control, which hampers ATE applications.

Furthermore, the wired-OR nature of the sync line 111 physically limits the sync line cable. For example, the same transmission line must be used to inter-connect the devices and/or modules within devices, which creates loading problems. Also, transmission line stubs caused by routing the sync line 111 into each instrument cause longer settling time and limit the number of instrument modules which can be connected to a single, non-hierarchical sync line 111.

SUMMARY

In a representative embodiment, an apparatus includes a global synchronization interface having a global synchronization driver for driving a global synchronization signal, and multiple modules having corresponding local synchronization interfaces. Each local synchronization interface includes a local synchronization driver for driving a local synchronization signal. In a local mode, the modules ignore the global synchronization signal and synchronize corresponding operations according to the local synchronization signal and a global reference signal. In a global mode, the modules ignore the local synchronization signal and synchronize the corresponding operations according to the global synchronization signal and the global reference signal.

In another representative embodiment, a device in a synchronized multiple input, multiple output (MIMO) system includes a global synchronization driver, multiple modules and a disabler. The global synchronization driver drives a global synchronization signal based on a reference clock. Each of the modules includes a field programmable gate array (FPGA) and a local synchronization driver for driving a local synchronization signal based on the reference clock. The disabler is connected to the global synchronization driver for selectively enabling and disabling the global synchronization mode. When the global synchronization mode is enabled, an operation of each FPGA is synchronized with an operation of at least one other device of the MIMO, according to the global synchronization signal and the reference clock. When the global synchronization mode is disabled, the operation of each FPGA is synchronized with an operation of at least one other module of the multiple modules, according to the local synchronization signal and the reference clock.

In another representative embodiment, a method is provided for selectively synchronizing operations of a device having multiple modules. The method includes receiving a reference signal; synchronizing operations of the modules to operations of at least one other device in a global mode, based on a global sync signal and the reference signal; and synchronizing the operations of the modules with one another in a local mode, based on a local sync signal and the reference signal. The global sync signal is mapped to the local sync signal in the global sync mode, and the global sync signal is driven to a high state in the local sync mode.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

According to various embodiments, each device in a MIMO system may operate in a local synchronization mode for synchronizing modules within the device and a global synchronization mode for synchronizing devices (and corresponding modules) within the MIMO system. Partitioning synchronization into separate modes provides a convenient way for switching the scope of synchronization between local and global levels, for example, without having to physically remove synchronization cables, thus creating a hierarchy of operations. It also reduces the physical extent and number of loads on each instrument, thus improving associated settling time.

Figure 1:
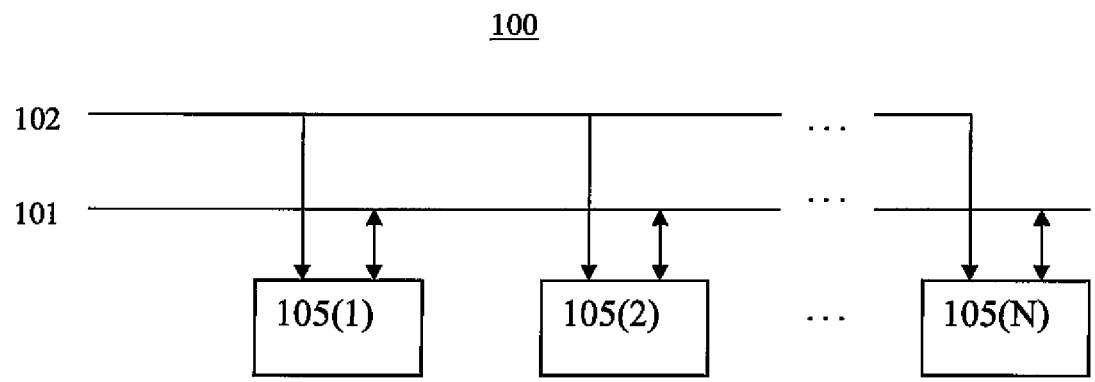
FIG. 1 is a block diagram illustrating a conventional system including multiple synchronized devices.
Figure 2:
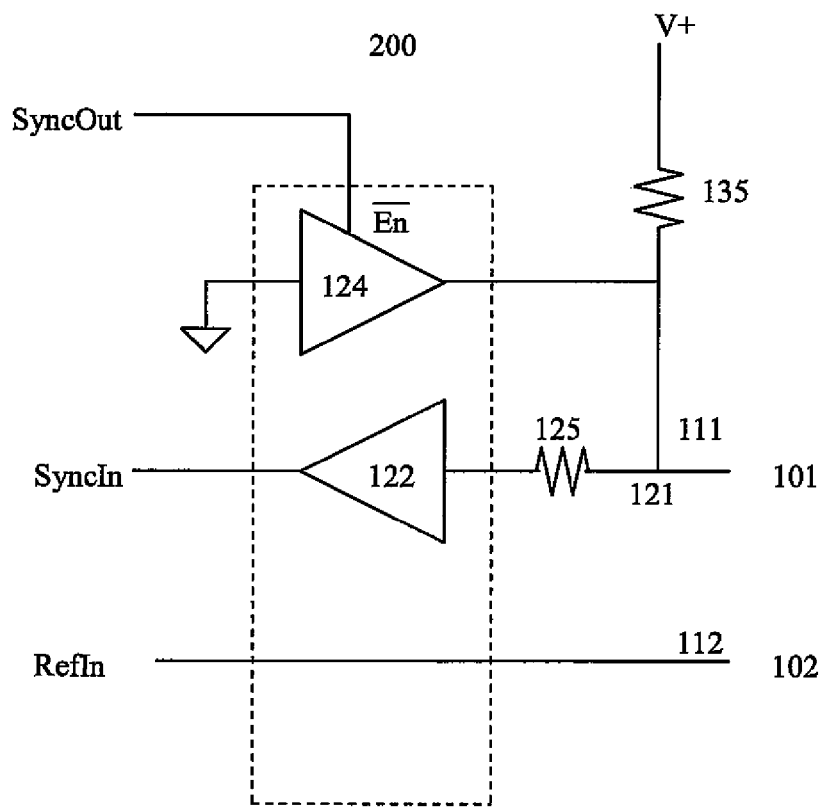
FIG. 2 is a block diagram illustrating a portion of a conventional synchronization buffer.
Figure 3:
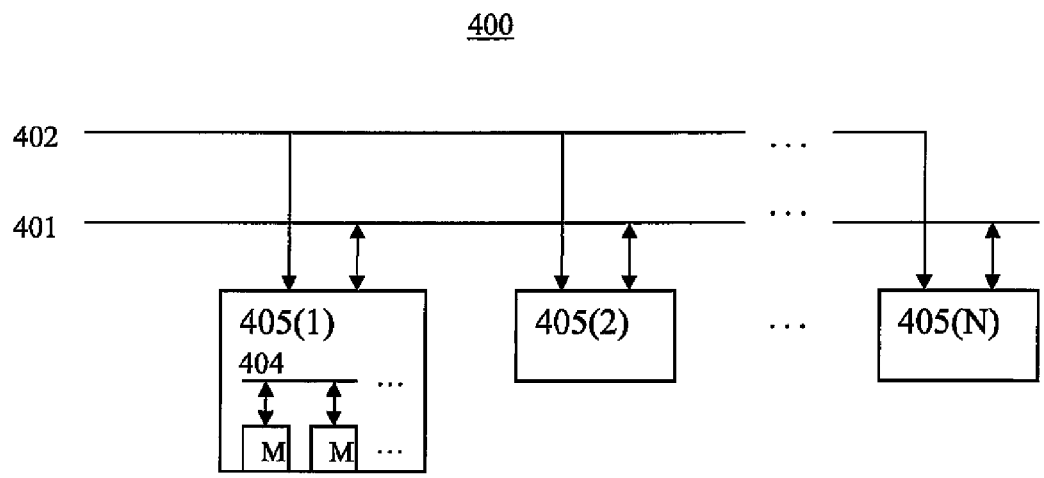
FIG. 3 is a block diagram illustrating a system including multiple devices configured for global and/or local synchronization, according to a representative embodiment.

FIG. 3 is a simplified block diagram showing a MIMO system 400 according to a representative embodiment. MIMO system 400 includes multiple devices 405(1), 405(2), . . . 405(N) in a daisy chain, which are synchronized based on a "global" or "system" sync signal 401 and reference signal 402, similar to the system illustrated in FIG. 1, above. However, each of the devices 405(1) through 405(N) in the chain may further include subsystems, such as separate modules M or plug-in boards, as indicated in device 405(1). These modules M are interconnected by an internal sync line to receive a "local" or "instrument" sync signal 404, in addition to the global sync signal 401. Various components and interconnections of the illustrative device 405(1) are shown in detail in FIG. 6, according to a representative embodiment.

Figure 4:
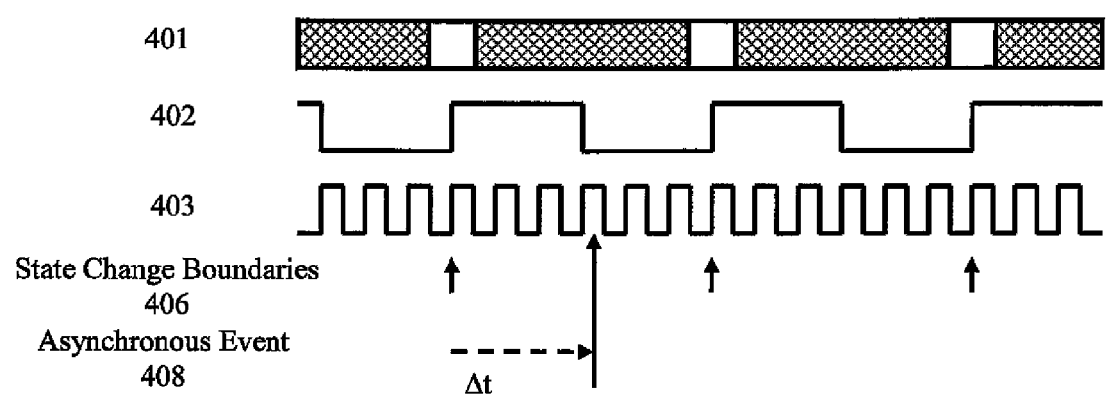
FIG. 4 is a timing diagram illustrating representative synchronization signaling of FIG. 3.

FIG. 4 is a timing diagram corresponding to operation of a device (e.g., device 405(1)) in the daisy chained MIMO system 400. The timing diagram applies to synchronization of devices and/or subsystems within the devices based on global or local sync signals and reference signals, respectively. In other words, the illustrative timing may apply to synchronization among devices 405(1) through 405(N) on a global level, or to synchronization among modules within a device (e.g., modules 450-480 within device 405(1) shown in FIG. 6, discussed below) on a local level. However, for ease of explanation, the timing of FIG. 4 will be described on the global level, as applicable to devices 405(1) through 405(N) based on the global sync signal 401, for example, although it is understood that the timing would likewise apply to local synchronization.

All of the devices 405(1) through 405(N) are required to change corresponding drive states of a sync line at times that avoid rising edges of reference signal 402. This assures that every device 405(1) through 405(N) is able to sample the sync signal 401 at rising edges of the reference signal 402 without ambiguity in the state of the sync signal 401. In other words, the devices 405(1) through 405(N) agree on every sampled state of the sync signal 401. Therefore, precise timing of the sync signal 401 is not necessary since the sync signal 401 is effectively used only to mark edges of the reference signal 402, as shown in FIG. 4. Precise timing needed for successful synchronization of device 405(1) through 405(N) is provided by the reference signal 402.

Internal clock 403 is a clock signal provided internally by each device, such as devices 405(1) through 405(N). Each internal clock 403 may have the same or different frequencies from the others. Further, as shown in FIG. 4, the internal clock 403 may have a higher frequency than the reference signal 402, although the internal clock 403 must operate on a multiple of the reference signal 402. For example, the internal clock 403 may have a frequency of 100 MHz, as compared to a 10 MHz frequency of the reference signal 402.

The state change boundaries 406 indicate the marked edge of the reference signal 402 for purposes of coordinating timing of events. For example, FIG. 4 shows a rising edge of the internal clock 403 corresponding to the rising edge of the reference signal 402, which has been marked by the sync signal 401, indicated by the non-hatched portion of the sync signal 401. The device 405(1) is then responsible to synchronize its events to the reference signal 402 based on operation of its internal clock 403. However, the time alignment of the internal clock must be fixed, so the device 405(1) can associate without ambiguity a particular edge of its internal clock 403 with each edge of the reference signal 402. Thus, a time mark can be effectively transferred to the high frequency internal clock 403, and can then be used to initiate appropriate changes device state. Thus, the entire system can accomplish synchronous state changes with a timing granularity of 100 ns.

For example, FIG. 4 shows an asynchronous event 408, such as an external trigger signal, which occurs at time Δt following a marked rising edge of the reference signal 402. The precise time of the asynchronous event 408 may be determined using the internal clock 403, for example, based on the number of internal clock cycles occurring after the rising edge of the reference signal 402. This information can be used to adjust measurement results to compensate for the time offset.

Figure 5:
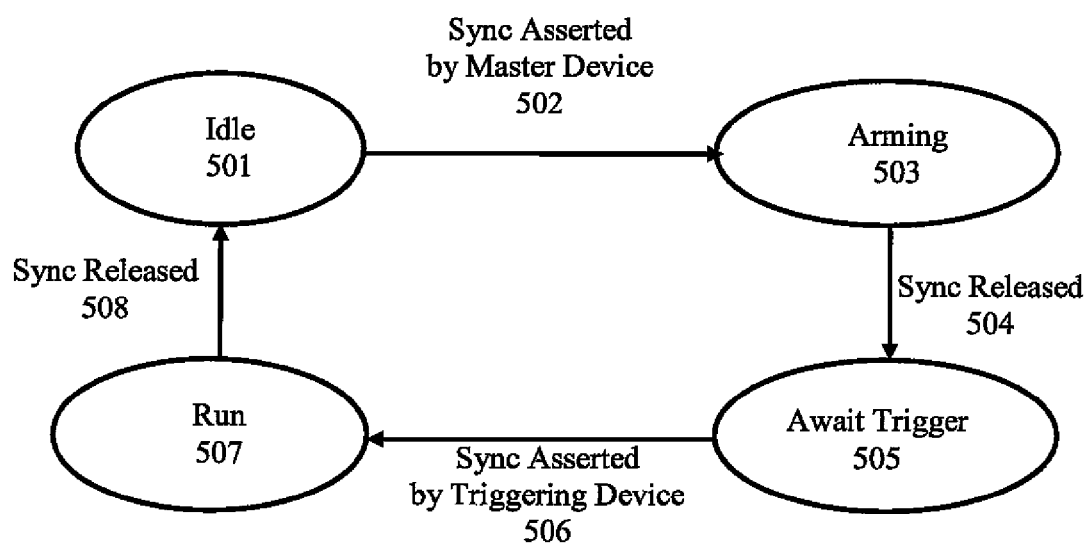
FIG. 5 is a state diagram illustrating states of multiple devices and/or device modules configured for global and/or local synchronization, according to a representative embodiment.

FIG. 5 shows a generalized state diagram applicable to devices and/or subsystems synchronizing operations based on global or local sync signals and reference signals, according to various embodiments. In other words, the illustrative states and state transitions may apply to devices 405(1) through 405(N) operating in the MIMO system 400 on a global level, or to modules within a device (e.g., modules 450-480 within device 405(1) shown in FIG. 6, discussed below) on a local level. However, for ease of explanation, the states and state transitions will be described on the global level, as applicable to devices 405(1) through 405(N) based on the global sync signal 401, for example.

Each device (e.g., 405(1) through 405(N)) may be controlled via software and/or firmware for non-time critical commands, such as forcing a device into its idle state, discussed below. In an embodiment, commands and other control information may be received, for example, through a user or machine interface (not shown). The global sync signal 401 is used as shown to cause time critical state transitions for each of the devices. To assure that all devices in the MIMO system 400 agree on the state of the global sync signal 401 for a given edge of the reference signal 402, SyncOut states provided by each device do not change within a predetermined vicinity of the rising edges of the reference signal 402. For example, in an embodiment, SyncOut on device 405(1) does not change within a time period from about 40 ns prior to through about 10 ns after the detected rising edge of the reference signal 402.

Referring to FIG. 5, the representative sequence of operation begins at state 501, in which each device (e.g., 405(1) through 405(N)) is forced to its idle state, e.g., under software or interface control. At 502, one of the devices, which may be designated the "master device" for purposes of this operation, "asserts sync" by driving the global sync signal 401 low. This may be accomplished, for example, by the master device and/or a module within the master device, as discussed below, providing a low (e.g., logic "0") SyncOut signal. In response, all devices (including the master device) recognize the transition of the global sync signal 401 via respective SyncIn signals, and all of the devices simultaneously move to arming state 503.

While in the arming state 503, each device is required to also assert sync until it has completed its arming tasks in the arming state 503. For example, arming may require a receiver of the device 405(1) to collect sufficient pre-trigger data samples, or a source of the device 405(1) to fill a computational data path with valid samples. As each device completes its arming task, it "releases sync" at 504. This may be accomplished, for example, by each device and/or the modules within the device providing a high (e.g., logic "1") SyncOut signal, which allows the global sync signal 401 to go high. However, in an embodiment, the global sync signal 401 does not actually go high until all devices have released sync. After all devices are armed, the global sync signal 401 goes high at 504, causing all devices to simultaneously move to the wait for trigger state 505, as each device recognizes the transition of the global sync signal 401.

Any device (e.g., 405(1) through 405(N)) in the MIMO system 400 can cause a trigger by asserting sync at 506, thereby driving the global sync signal 401 low. The device that asserts Sync may be referred to as the "triggering device." The triggering may be software initiated or the result of an external trigger, for example, provided via a user or machine interface. The devices simultaneously enter their respective run state 507 when all devices have recognized that sync has been asserted at 506.

Upon entering the run state 507, each device also asserts sync until it has completed its designated task, at which point it releases sync. After all running devices have completed their tasks and have released sync at 508, the completed devices return to the idle state 501. As discussed above with respect to the arming state 503, in an embodiment, the global sync signal 401 does not actually go high until all running devices have released sync. Thus, in response to the last running device releasing sync, the global sync signal 401 goes high at 508, causing all devices to simultaneously move to the idle state. The sequence may then be repeated, e.g., when a master device drives the global sync signal 401 low at 502.

Referring again to the run state 507, in some cases, a particular device will stay in the run state indefinitely, unless commanded otherwise by software or interface control. The device may therefore optionally release sync while still performing run tasks, so that other "batch oriented" devices can use the global sync signal 401 for subsequent triggers. The continuously running device in this situation simply ignores the global sync signal 401 while in its run state 507.

Figure 6:
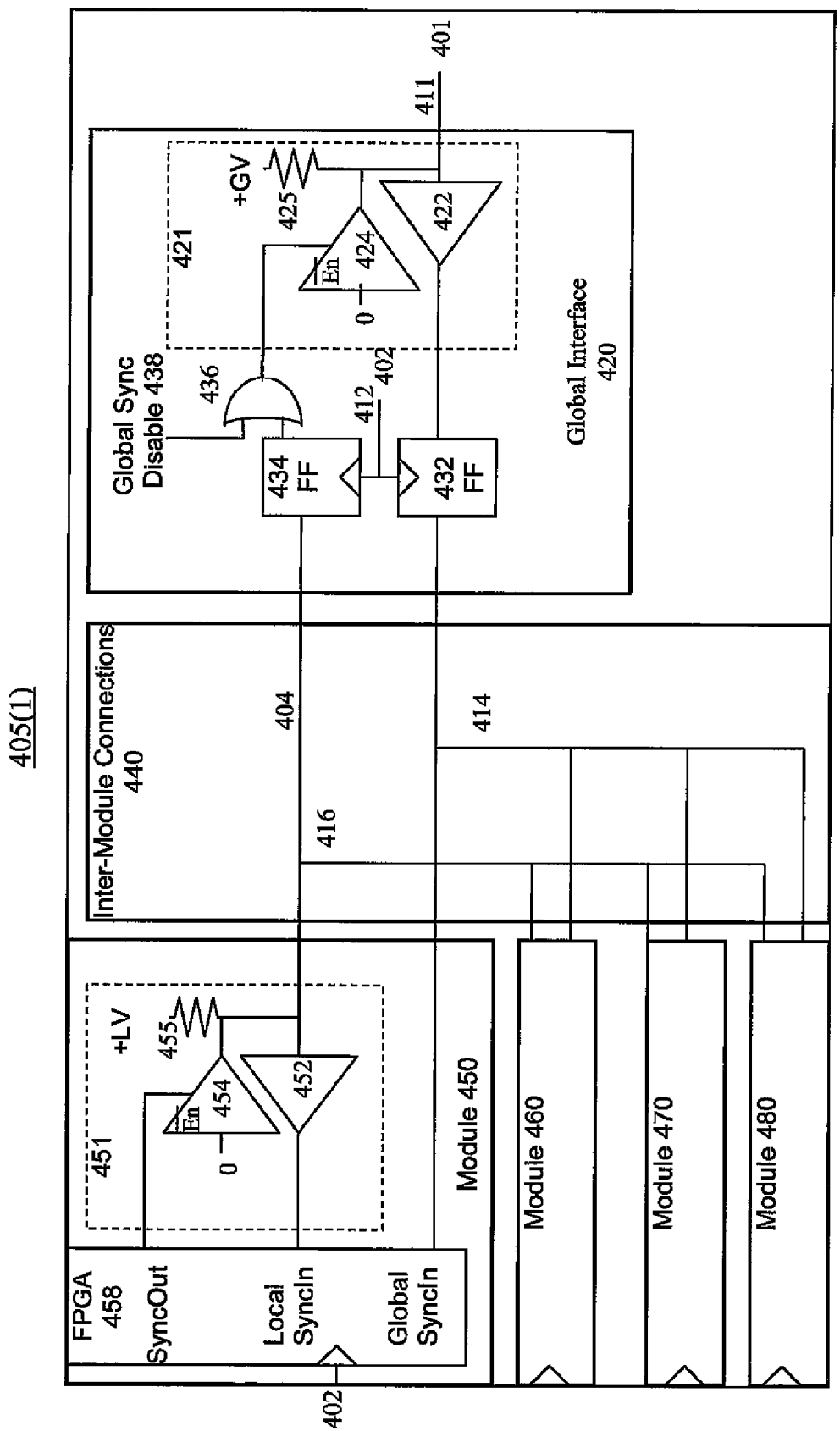
FIG. 6 is a block diagram illustrating a device of FIG. 3 configured for global and/or local synchronization, according to a representative embodiment.

FIG. 6 is a block diagram of the illustrative device 405(1) of FIG. 4, according to a representative embodiment. As discussed above, device 405(1) participates in the MIMO system 400, which includes at least one other instrument (indicated in FIG. 4 as devices 405(2) through 405(N)) having substantially similar configurations with respect to synchronization. That is, all of the devices within the MIMO system 400 are configured to be hierarchically synchronized with one another according to the global sync signal 401, reference signal 402 and respective local sync signals, as discussed below. In an embodiment, the device 405(1) may be automated test equipment (ATE), such as a swept spectrum analyzer, for example. However, it is understood that the device 405(1) represents any of various types of devices that may require hierarchical synchronization based on requirements for internal and/or external synchronization.

Referring to FIG. 6, device 405(1) is an illustrative device of MIMO system 400 that participates in the illustrative state changes depicted in FIG. 5. To accomplish this, device 405(1) includes a global interface 420, an inter-module connector 440 and multiple modules, represented by modules 450, 460, 470 and 480. Only module 450 is shown in detail, for ease of explanation, although it is understood that each of the modules may have substantially the same general configuration with respect to implementing synchronization.

The global interface 420 includes a global synchronization driver 421, which is connected to global synchronization line 411 to receive the global sync signal 401. The global synchronization driver 421 also includes an input buffer 422, having an input connected to the global synchronization line 411, and an output buffer 424, having an output connected between the global synchronization line 411 and a voltage +GV through pull-up resistance 425. In an illustrative embodiment, the voltage source +GV may be 3.3 volts, for example, and the global sync signal 401 may thus use 3.3V LV-CMOS logic levels and tri-state drivers to implement a bidirectional connection with each participating device with the MIMO system 400. An input of the output buffer 424 is connected to low voltage, such as a ground voltage or 0 volts.

The value of the pull-up resistance 425 may be a standardized value, which optimizes the number of instruments and cable length constraints for connection among instruments in the MIMO system 400. For example, as discussed above, the value of the pull-up resistance 425 may be chosen to achieve an RC time constant of approximately 25 ns, where C is the total capacitance of the sync node inside the device 405(1), plus 50 pf for external cable capacitance. This allows 0.5 m of 50 ohm cable per device for sync interconnect. In an illustrative embodiment, the value of the pull-up resistance 425 may be about 200-500 ohms. The value of the pull-up resistance 425 may vary to provide unique benefits for any particular situation or to meet application specific design requirements of various implementations, as would be apparent to one skilled in the art.

The global interface 420 also includes flip-flops 432 and 434, which respectively receive reference signal 402 through reference signal line 412 as a clock. In an illustrative embodiment, the reference signal 402 is a singe-ended square wave having fast rise-time edges. The frequency of the reference signal 402 may be 10 MHz, for example, although it is understood that other frequencies may be implemented without departing from the spirit and scope of the disclosure. To preserve edge fidelity of the reference signal 402, the reference signal line 412 may be a doubly terminated coaxial (e.g., 50 ohm) transmission line, for example. In various embodiments, flip-flops 432 and 434 may be implemented as latches with corresponding clock inputs, or other storage components having similar functionality.

The global interface 420 also includes OR gate 436, which receives input from the flip-flop 434 and a global synchronization disable signal 438. The global synchronization disable signal 438 is a control signal that may be software/firmware generated, or may be entered through an external user or machine interface (not shown). An output of the OR gate 436 is provided to an active low enable terminal ($\overline{En}$) of the output buffer 424. Therefore, when the global synchronization disable signal 438 is activated (e.g., set to "1" or high logic level), the output buffer 424 of the global synchronization driver 421 is effectively disabled and the device 405(1) operates in a local mode. When the global synchronization disable signal 438 is deactivated (e.g., set to "0" or low logic level), the output buffer 424 of the global synchronization driver 421 is selectively enabled, depending on the value of local sync signal 404 on local synchronization line 416, and the device 405(1) operates in a global mode. The local and global modes are discussed in detail, below.

Only one global interface 420 is required in the device 405(1) to access the external global synchronization line 411. Therefore, the global interface 420 may be "hosted" by one module, such as module 450. The hosting module contains both an instrument synchronization driver (e.g., 451) and a global synchronization driver (e.g., 421). In alternative embodiments, the global interface 420 may be hosted by another one of the modules 450-480, or implemented as a separate module, as shown.

Flip-flop 432 receives and stores a Global SyncIn signal, which is the buffered signal global sync signal 401 received from the input buffer 422 of the global synchronization driver 421. The Global SyncIn signal is provided on the internal global synchronization line 414 to each of the modules 450-480 through inter-module connector 440. Referring to module 450, in particular, the Global SyncIn signal is received by a field-programmable gate array (FPGA) 458, or other programmable logic device or processor. FPGA 458 also receives a Local SyncIn signal via the local synchronization line 416 and input buffer 452 of instrument synchronization driver 451

The instrument synchronization driver 451 also includes output buffer 454, which has an input connected to ground or low voltage, and an active low enable terminal ($\overline{En}$) connected to receive the SyncOut signal from FPGA 458. An input of the input buffer 452 and an output of the output buffer 454 are connected to a local voltage source LV+ through a pull-up resistance 455. The value of LV+ may be the same as the value of GB+ (e.g., 3.3 V), or it may be another voltage, depending on design requirements of various implementations, as would be apparent to one skilled in the art. Likewise, the value of the pull-up resistance 455 of the instrument sync driver 451 is optimized for the particular capacitance and transmission line loading inside the device 405(1), and thus may vary to provide unique benefits for any particular situation or to meet application specific design requirements of various implementations, as would be apparent to one skilled in the art. The instrument synchronization driver 451 may also include a resistance (not shown) between the input of the input buffer 452 and the local synchronization line 416.

FPGA 458 outputs the SyncOut signal, which asserts sync or releases sync on behalf of FPGA 458 and/or the device 405(1), as discussed above with respect to FIG. 5. More particularly, when the SyncOut signal is low, the output buffer 454 of the instrument synchronization driver 451 is enabled and the local sync signal 404 on the local synchronization line 416 is driven low, and when the SyncOut signal is high, the output buffer 454 is effectively disabled and the local sync signal 404 on the local synchronization line 416 is allowed to go high (e.g., by the pull-up resistance 455). The SyncOut signal is driven synchronously with the reference signal 402, which is input to FPGA 458 as a clock.

Module 450 synchronizes its operations in accordance with the reference signal 402 and one of the Local SyncIn signal in the local mode or the Global SyncIn signal in the global mode. The determination is made in response to the global synchronization disable signal 438 of the global interface 420. The global synchronization disable signal 438 may be activated, for example, by a software write to a control register (not shown). Also, the module 450 and/or the device 405(1) include an internal reference clock, which may have a higher frequency than the reference signal 402 and operates on a multiple of the reference signal 402 frequency to establish event timing, as discussed above with respect to FIG. 4. For example, the internal clock may have a frequency of 100 MHz and the reference signal 402 may have a frequency of 10 MHz.

As discussed above, when the global synchronization disable signal 438 is activated (e.g., set to a "1" or high logic level), the output buffer 424 of the global synchronization driver 421 is disabled and the global sync signal 401 on the global synchronization line 411 is held high, e.g., by pull-up resistance 425. This effectively causes the device 405(1) to release sync with respect to the global synchronization line 411, while the other devices in the MIMO system 400 are free to continue using the global sync signal 401. In response, the module 450 ignores the Global SyncIn signal, and synchronizes locally, e.g., using the Local SyncIn signal. In this mode, each internal module 450-480 may effectively operate according to conventional non-hierarchical synchronization standards.

When the global synchronization disable signal 438 is deactivated (e.g., set to a "0" or low logic level), the output buffer 424 of the global synchronization driver 421 is enabled, and thus the device 405(1) is able to drive the global synchronization line 411. In response, the module 450 ignores the Local SyncIn signal and synchronizes globally with the other modules and/or devices in the MIMO system 400, based on the Global SyncIn signal. Each of the other modules 460-480 of the device 405(1) likewise synchronize locally or globally based on whether the output buffer 424 of the global synchronization driver 421 has been disabled.

More particularly, when the local sync signal 404 received through the flip-flop 434 is high, the OR gate 436 provides a high output signal to the output buffer 424 through the active low enable terminal, which is accordingly disabled, allowing the global sync signal 401 to go high (e.g., releasing sync). When the local sync signal 404 received through the flip-flop 434 is low, the OR gate 436 provides a low output signal to the output buffer 424, which is accordingly enabled, driving the global sync signal 401 low (e.g., asserting sync). Accordingly, the SyncOut provided to the global synchronization driver 421 is effectively mapped to the SyncOut provided to the local synchronization driver 451 of Module 450 (as well as the local synchronization drivers of the other modules 460-480). Likewise, the global sync signal 401 is effectively mapped to the local sync signal 404.

In the global synchronization mode, i.e., using the Global SyncIn signal for synchronization, additional cycles of the reference signal 402 are required to account for additional pipeline latency, e.g., introduced by operation of the flip-flops 432, 434. This latency can be tolerated by modifying the measurement loop state machine within each module 450-480. In other words, whenever module 450, for example, changes the state of its SyncOut signal from low to high (or high to low), the new drive level must be maintained for at least three cycles of the reference signal 402. For example, the module 450 may assert sync, moving from an idle state (state 501 of FIG. 5) to an arming state (state 503). This assures that the new drive level propagates around the loop from the SyncOut signal of module 450 to the Global SyncIn signal before any further change is made, and prevents premature movement to a subsequent state. All devices (e.g., devices 405(1) through 405(N), as well as corresponding modules) within the MIMO system 400 still move on the same clock cycle after the additional cycles when operating in the global synchronization mode. It is apparent that any delay in state changes would have no impact on system performance.

Thus, generally, each module 450-480 drives a corresponding SyncOut line synchronously with the reference signal 402. Each module 450-480 also receives the Global SyncIn signal via internal global synchronization line 414 and the Local SyncIn signal via local synchronization line 416 (and corresponding input buffer), and samples one of the Global SyncIn signal and the Local SyncIn signal at rising edges of the reference signal 402, depending on whether the device 405(1) is operating in the global mode or the local mode. The mode is determined by the global synchronization driver 421 in response to the global synchronization disable signal 438, discussed above.

In view of this disclosure it is noted that variant instruments can be implemented in keeping with the present teachings. Further, the various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. An apparatus, comprising:
   a global synchronization interface comprising a global synchronization driver for driving a global synchronization signal; and
   a plurality of modules receiving a global reference signal, each module of the plurality of modules comprising a local synchronization driver for driving a local synchronization signal and a programmable logic device,
   wherein the programmable logic device is configured to ignore the global synchronization signal and to synchronize corresponding operations according to the local synchronization signal and the global reference signal in a local mode, and the programmable logic device is configured to ignore the local synchronization signal and to synchronize the corresponding operations according to the global synchronization signal and the global reference signal in a global mode.

2. The apparatus of claim 1, wherein the global synchronization signal synchronizes the corresponding operations of the plurality of modules with operations of a second plurality of modules in a second apparatus in the global mode.

3. The apparatus of claim 1, wherein the global synchronization interface further comprises a global synchronization disabler configured to prevent the global synchronization driver from driving the global synchronization signal in the local mode, based on activation of a disable signal.

4. The apparatus of claim 3, wherein the global synchronization disabler comprises an OR gate configured to receive the disable signal and the local synchronization signal, such that the activation of the disable signal causes an output of the OR gate to be held high, which disables an output buffer of the global synchronization driver.

5. The apparatus of claim 1, wherein each local synchronization driver is configured to drive the local synchronization signal synchronously with the global reference signal in accordance with a corresponding synchronization out signal.

6. The apparatus of claim 5, wherein, when operating in the global mode, each module retains a drive level of the corresponding synchronization out signal for at least two additional cycles of the global reference signal after changing a state of the corresponding synchronization out signal.

7. The apparatus of claim 3, wherein the global driver is configured to drive a corresponding global synchronization out signal, received through the global synchronization disabler, synchronously with the global reference signal.

8. The apparatus of claim 1, wherein the reference signal comprises a 10 MHz clock.

9. The apparatus of claim 8, wherein the global synchronization interface samples the global synchronization signal at rising edges of the reference signal.

10. The apparatus of claim 9, wherein each programmable logic device is configured to sample the local synchronization signal at the rising edges of the reference signal.

11. The apparatus of claim 1, wherein one of the plurality of modules hosts the global synchronization interface.

12. The apparatus of claim 1, wherein each local synchronization driver comprises a pull-up resistance connected to a positive voltage, the resistance being optimized for a predetermined capacitance and transmission line loading of the apparatus.

13. The apparatus of claim 12, wherein the positive voltage is 3.3 volts and the resistance is between 200-500 ohms.

14. A device in a synchronized multiple input, multiple output (MIMO) system, the device comprising:
a global synchronization driver for driving a global synchronization signal based on a reference clock;
a plurality modules, each module comprising a field programmable gate array (FPGA) and a local synchronization driver for driving a local synchronization signal based on the reference clock; and
a disabler connected to the global synchronization driver for selectively enabling and disabling a global synchronization mode;
wherein, when the global synchronization mode is enabled, an operation of each FPGA is synchronized with an operation of at least one other device of the MIMO, according to the global synchronization signal and the reference clock, and
wherein, when the global synchronization mode is disabled, the operation of each FPGA is synchronized with an operation of at least one other module of the plurality of modules, according to the local synchronization signal and the reference clock.

15. The device of claim 14, wherein the global synchronization disabler comprises an OR gate configured to receive a disable signal and the local synchronization signal.

16. The device of claim 15, wherein the disable signal comprises a software generated control signal.

17. The device of claim 16, wherein when the disable signal is high, the output of the OR gate is held high, which disables an output buffer of the global synchronization driver.

18. The device of claim 14, wherein the operation of each FPGA comprises changing from a first state to a second state.

19. The device of claim 18, wherein the changing from the first state to the second state is delayed for at least two cycles of the reference clock when the global synchronization mode is enabled.

20. A method of selectively synchronizing operations of a device comprising a plurality of modules, the method comprising:
receiving a reference signal;
synchronizing operations of the plurality of modules to operations of at least one other device in a global mode, based on a global sync signal and the reference signal; and
synchronizing the operations of the plurality of modules with one another in a local mode, based on a local sync signal and the reference signal,
wherein the global sync signal is mapped to the local sync signal in the global sync mode, and the global sync signal is driven to a high state in the local sync mode.

* * * * *

UNITED STATES PATENT AND TRADEMARK OFFICE
CERTIFICATE OF CORRECTION

PATENT NO. : 8,243,714 B1
APPLICATION NO. : 12/115100
DATED : August 14, 2012
INVENTOR(S) : Howard Hilton et al.

Page 1 of 1

It is certified that error appears in the above-identified patent and that said Letters Patent is hereby corrected as shown below:

On the Title Page, Item (54), line 2, and in column 1, line 2, in "Title", delete "HIERARCHIAL" and insert -- HIERARCHICAL --, therefor.

Signed and Sealed this
Fourth Day of December, 2012

David J. Kappos
*Director of the United States Patent and Trademark Office*